United States Patent [19]

Otto

[11] Patent Number: 5,052,047
[45] Date of Patent: Sep. 24, 1991

[54] MODULATOR-REMODULATOR WITH COMMON LOCAL OSCILATOR

[75] Inventor: Leif W. Otto, Niles, Ill.

[73] Assignee: Zenith Electronics Corporation, Glenview, Ill.

[21] Appl. No.: 507,345

[22] Filed: Apr. 10, 1990

[51] Int. Cl.[5] .......................................... H04N 7/167
[52] U.S. Cl. ........................................... 455/1; 380/7
[58] Field of Search ................... 380/7, 10, 13; 455/1

[56] References Cited

U.S. PATENT DOCUMENTS

| | | | |
|---|---|---|---|
| 4,677,685 | 6/1987 | Kurisu | 358/86 X |
| 4,771,456 | 9/1988 | Martin et al. | 380/13 X |
| 4,825,468 | 4/1989 | Ellis | 380/7 |
| 4,837,820 | 6/1989 | Bellavia, Jr. | 455/1 X |
| 4,841,569 | 6/1989 | Wachob | 455/1 X |
| 4,860,379 | 8/1989 | Schoeneberger et al. | 358/86 X |
| 4,864,613 | 9/1989 | Van Cleave | 380/10 |
| 4,912,760 | 3/1990 | West, Jr. et al. | 455/1 X |
| 4,914,695 | 4/1990 | Martin | 380/7 |

*Primary Examiner*—James J. Groody
*Assistant Examiner*—Mark R. Powell

[57] ABSTRACT

A channel converter system includes a local oscillator for converting an input RF television channel frequency signal to an intermediate frequency and for remodulating the intermediate frequency signal to produce a channel output signal at the same frequency. Video processing is accomplished between the input converter and the output remodulator. For baseband decoding, another oscillator demodulates the intermediate frequency signal and remodulates the processed video signal to the intermediate frequency signal.

7 Claims, 3 Drawing Sheets

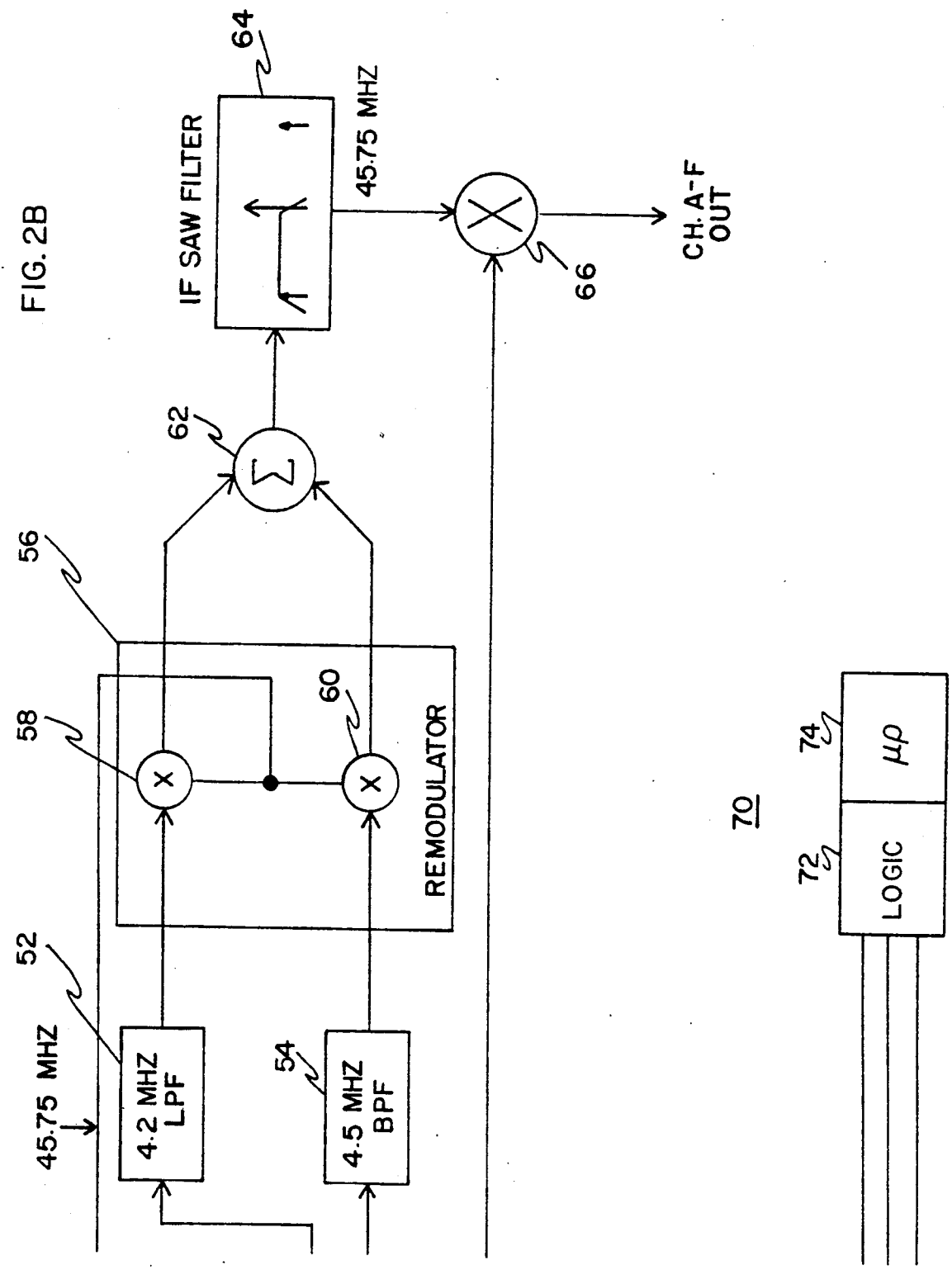

ated by the cable head-end to select any one of the six television channel signals in the group for conversion to a fixed intermediate frequency signal. Descrambling is performed either at intermediate frequency or at baseband frequency to develop a processed (unscrambled) video signal which is remodulated by the same local oscillator to the RF channel frequency of the original incoming television signal. The remodulated signal (at the same channel frequency) is supplied to the subscriber along with the bypassed unscrambled television signals. The modular approach and the provision of a single local oscillator for both demodulation and remodulation produces a very attractive cable converter system. The system eliminates the need for separate remote control devices since the subscriber uses the existing television receiver tuner, and eliminates the interaction between the user and the cable decoder, which makes the system much simpler.

MODULATOR-REMODULATOR WITH COMMON LOCAL OSCILATOR

BACKGROUND OF THE INVENTION AND PRIOR ART

This invention relates generally to television signal tuning systems and particularly to cable antenna television (CATV) tuning systems. In so-called pole mounted cable television systems, each individual cable subscriber has a simple cable input to his terminal (television receiver). In these systems, the full functional control afforded by a television receiver (or video cassette recorder) is retained. A difficulty arises with respect to premium channels (usually scrambled) for which an extra charge is imposed by the cable head-end.

Many types of interference systems are in use in which the premium channel signals are scrambled by an interfering signal generated at the pole installation. The subscriber cannot receive an intelligible picture even though his receiver is tuned to the appropriate channel frequency. Such systems, while effective, require traps to be set at the pole sites and are costly because they are labor intensive.

The system of the invention uses a novel local oscillator arrangement for achieving an economical cable decryption system. For maximum benefit, the invention discloses taking advantage of the placement of encrypted channels within particular groups of cable channels. For example, conventional, non-premium, NTSC television channels are allocated to a given frequency band and are provided in unscrambled form directly to individual cable subscribers as part of their basic service. Premium or scrambled channels are included in groups of frequencies in different bands and are available to individual subscribers only upon payment of an appropriate fee. The premium channels are unscrambled by a local oscillator that converts the scrambled signal to an intermediate frequency signal. Decryption is performed and the oscillator remodulates the intermediate frequency signal back to the frequency of the incoming channel, which is provided, along with the bypassed unscrambled channels, to the subscriber.

A feature of this invention is the provision of a local oscillator in a channel tuning module that covers a limited group of contiguous channels (six in the preferred embodiment). The local oscillator is tunable by

OBJECTS OF THE INVENTION

A principal object of the invention is to provide a novel cable converter system.

Another object of the invention is to provide a cable converter system of improved efficiency and cost effectiveness.

A further object of the invention is to provide an improved pole type cable channel television system.

A still further object of the invention is to provide a secure CATV system which does not require a converter in a subscriber's premises.

BRIEF DESCRIPTION OF THE DRAWINGS

These and other objects and advantages of the invention will be apparent upon reading the following description in conjunction with the drawings, in which:

FIGS. 2A and 2B together are a simplified block diagram of a channel tuning module used in the system of FIG. 1.

DESCRIPTION OF THE PREFERRED EMBODIMENT

Figure 1:
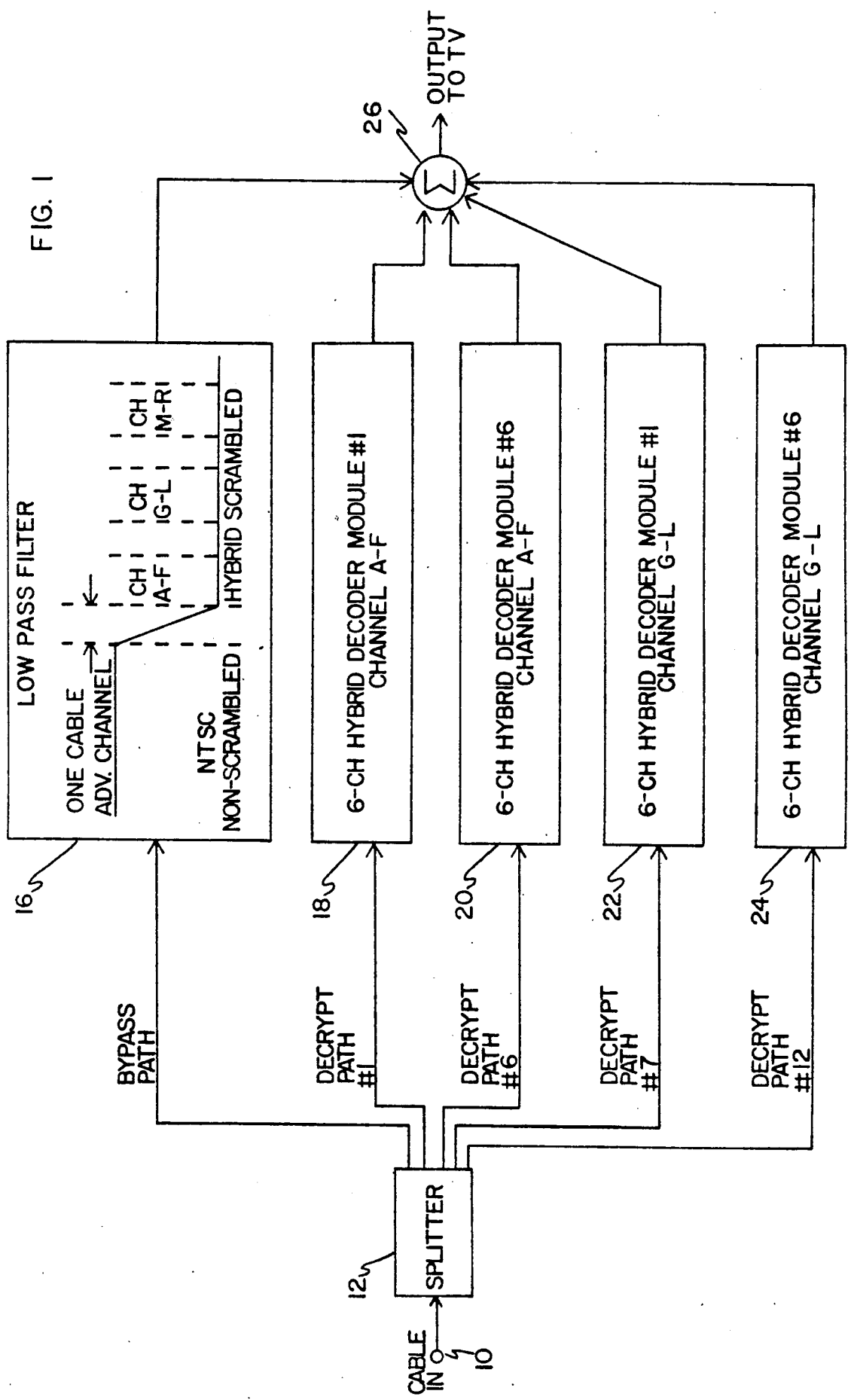
FIG. 1 is a simplified block diagram of a CATV system constructed in accordance with the invention.

In FIG. 1, a cable input terminal 10 is supplied with a plurality of television channel signals in the television signal frequency spectrum. The Input television signals are coupled to a splitter 12 which provides a multiplicity of "parallel paths," each with all of the television signals present at input terminal 10. A bypass path includes a low pass filter 16 which, as indicated, passes all NTSC non-scrambled television signals to an output summer 26. Filter 16 also provides one cable channel (referred to as a cable advertising channel) to output summer 26. The advertising channel, as its name implies, is used to preview special programs and to entice viewers to subscribe to premium channels. Communication between the cable head-end and the subscriber terminal is provided for in a well-known manner. As indicated, three groups of channels A-F, G-L and M-R of higher frequency than the non-scrambled NTSC channels are shown. Other such groups or bands may be allocated—up to the frequency limit of the head-end cable plant. They are indicated as being hybrid scrambled although that is not an essential part of the invention. Hybrid scrambling is fully disclosed in application Serial No. 238,956, filed 8/31/88, in the names of R. Citta and R. Lee, entitled TV SIGNAL TRANSMISSION SYSTEM AND METHOD and assigned to the same assignee as the present application, which application is incorporated by reference herein. The hybrid signal is formed by removing low frequencies from the video signal and encoding those low frequencies with a digital representation that is added back to the high frequency portion of the video signal. The many benefits of hybrid processing include a very much reduced power transmission demand for the video signal. Consequently, problems due to co-channel interference are greatly minimized with hybrid signals. As mentioned, while hybrid processing is not required for the practice of the present invention, its use does not result in a very attractive cable system.

A multiplicity of decryption paths emanate from splitter 12. For example, decryption path #1 through decryption path #6 include individual (but identical) six-channel tuning modules for channels A-F. A #1 six-channel tuning module 18 and a #6 six-channel tuning module 20 are illustrated, with the dotted line between the modules indicating the intermediate six-channel tuning modules #2–5. As will be seen, only the number of six-channel tuning modules required (by the subscriber) are used. The outputs of the tuning modules 18 through 20 are supplied to output summer circuit 26. Similarly, decryption paths #7–#12 are shown as including six-channel tuning modules #1–#6 for the G-L channel group. Six-channel tuning module #1 is identified by reference numeral 22 and six-channel tuning module #6 by reference numeral 24. The output of these tuning modules are also coupled to output summer 26. It will be appreciated by those skilled in the art that each of the six-channel tuning modules (shown as hybrid decoder modules in the preferred embodiment) is identical to every other one in its respective group so that module #1 in a group is the same as module #6 in that group. The other modules for the other groups, such as G-L, differ only in the frequency band to which they are tuneable. In other respects, they are identical.

It is contemplated that each pole mount cable installation may provide service for up to four subscribers. Each installation would include a low pass filter (for the bypass path) and one or more six-channel tuning (or decoder) modules, depending upon the number of premium channels that are offered and the nubmers that the individual subscribers have subscribed to. Assume, for example, that all of the channels A–F are premium channels, in scrambled form, and that a subscriber wishes to receive one of the channels, such as premium channel D. An appropriate sixchannel tuning module would be installed and used to tune the premium channel D signal and to remodulate it back to the same channel frequency so that it would be supplied, along with the non-scrambled NTSC channel signals from the bypass path, to output summer 26 and thence to the subscriber. The subscriber would only require a so-called cable ready television receiver or VCR to receive all non-scrambled NTSC signals and the premium channel (D) for which he is authorized. A subscriber may wish to receive more than one of the premium channels, which may either be in the group of channels A–F or in another group of channels, depending upon the particular cable system. In this situation, another six-channel tuning module would be added to the pole mount installation supplying that subscriber terminal and would be tuned by the cable head-end to enable the additional premium channel to be directly received by the subscriber on his cable ready television receiver. As will be seen, with the arrangement of the invention, the individual six-channel tuning modules are relatively low cost, reliable and may readily be provided with a high degree of security.

Figure 2A:
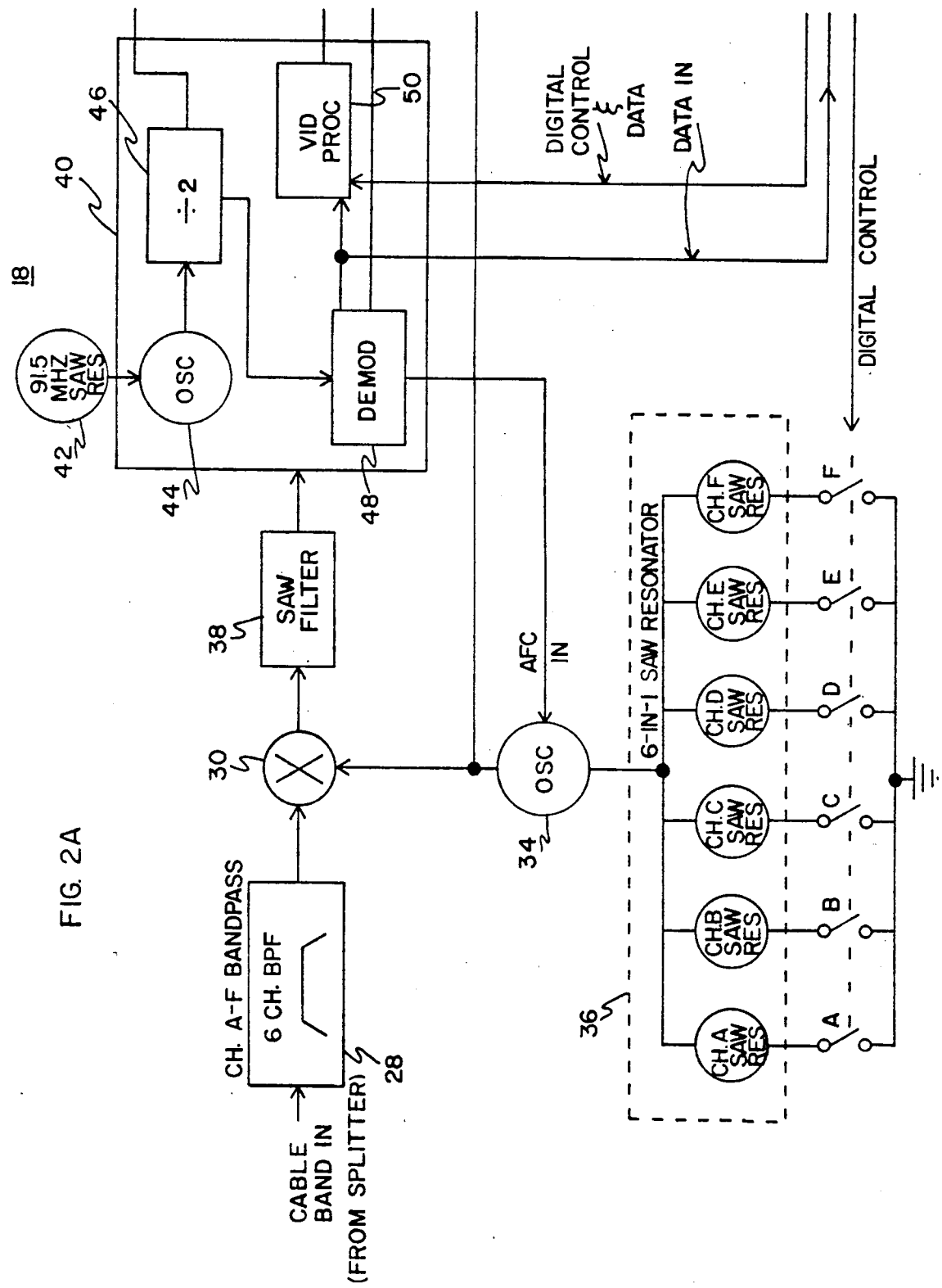

In FIGS. 2A and 2B, which should be placed side by side, one of the six-channel tuning modules 18 is shown in more detail. The full range of television input signals from splitter 12 is supplied to a channel A–F bandpass filter 28 which selects those frequencies from the splitter that are in the channel A–F frequency range. The output of the bandpass filter 28 is coupled to a multiplier 30 which is also supplied with signal from a local oscillator 34. The local oscillator 34 is in turn controlled by one of a group of six surface acoustic wave (SAW) resonators. These are indicated as channel A–F SAW resonators that are selectively activated by a plurality of switches A–F, respectively, by digital control from the cable head-end (not shown). This may be accomplished in-band over the premium channel selected, or by any other well-known method of communication between the cable head-end and the subscriber terminal.

The output of multiplier 30 consists of an intermediate frequency signal at 45.75 MHz that is applied to another SAW filter 38 and to an IF processing circuit 40. The IF processing circuit is coupled to a 91.5 MHz SAW resonator 42 that tunes another local oscillator 44, that is included in a phase locked loop circuit arrangement with a divide-by-two circuit 46 and a demodulator 48. The divide-by-two circuit is used to preclude the possibility of the oscillator locking to itself (as is well-known in the art). The oscillator output signal is $91.5/2 = 45.75$ MHz and is applied to the demodulator 48 for developing a baseband video signal and a 4.5 MHz audio signal. The baseband video signal is applied to a video processing circuit 50 whose output is coupled to a 4.2 MHz low pass filter 52 for passing the baseband video signal. The other output of demodulator 48 supplies the 4.5 MHz audio signal to a 4.5 MHz bandpass filter 54. The outputs of filter 52 and filter 54 are coupled to a remodulator 56 that includes a pair of multipliers 58 and 60, each of which receives the 45.75 MHz oscillator signal from divide-by-two circuit 46. The two outputs of the remodulator circuit 56 are applied to a summer 62. These are the 4.2 MHz video signal and the 4.5 MHz audio signal both remodulated back to the intermediate frequency of 45.75 MHz. The output of summer 62 is applied to another IF SAW filter 64 which passes only the 45.75 MHz IF signal to another multiplier 66. Multiplier 66 also receives the output of oscillator 34 to effect remodulation of the IF signal back to the original RF carrier frequency of the selected television channel signal. Thus, if television channel A was the selected television channel at the input of multiplier 30, then the output of multiplier 66 will again be television channel A (with a processed video signal).

In accordance with the teachings of the copending application incorporated herein, the signal from the demodulator 48 may include data that is removed and applied to a processing circuit 70 consisting of a logic circuit 72 and a microprocessor 74. The microprocessor 74 operates in conjunction with logic circuit 72 and video processor 50 to reconstitute the appropriate low frequency video information in accordance with the received data. A digital control and data signal is supplied to video processor 50 to control reconstruction of the original video signal. The control circuit 70 also applies digital control signals to switches A–F in the SAW resonators (under control of the cable head-end) for selecting the appropriate SAW resonator for operation with oscillator 34 to permit tuning of the desired one of the premium channel frequencies in the group of channels A–F.

In operation, the incoming television signals from the cable head-end are at RF frequencies, as are all of the signals supplied to the subscriber terminal. As discussed, these signals are from the bypass path and from any one or more of the sixchannel tuning modules installed. The non-scrambled signals are supplied directly from the pole mount installation to the subscriber input cable, whereas authorized premium channels are processed through appropriate tuning modules to receive (and descramble) the signal and to provide a remodulated (descrambled) signal at the same channel frequency to the subscriber terminal. If the premium channel signals are scrambled, they are descrambled before remodulation, by a single local oscillator that supplies both the input multiplier (converter) and the output multiplier (converter). In a baseband modulation system, such as one with hybrid processing, the IF signal developed by mixing the RF channel signal with a first local oscillator signal is further demodulated to baseband with a second limited-frequency local oscillator. The output of the baseband demodulator is processed in a video processor to decrypt the video signal at baseband frequencies. The video and the audio (if reduced to baseband) is remodulated by the second local oscillator back to an IF signal. The IF signal is further remodulated by the first local oscillator signal back to the original RF frequency signal. Thus the preferred embodiment utilizes the invention twice, with two local oscillators for demodulation and remodulation. It will be appreciated, however, that this is not required in the broader aspect of the invention and remodulation may be accomplished at IF signal frequencies without a second local oscillator for converting to baseband. Also, decryption is not required in the broadest aspect of the invention which concern demodulation and remodulation with a single local oscillator.

What has been described is a novel cable converter system in which a single oscillator is used to both demodulate and remodulate the incoming television signal and to produce an outgoing television signal at the same carrier frequency as the incoming television signal. It is recognized that numerous changes in the described embodiment of the invention will be apparent to those skilled in the art without departing from its true spirit and scope. The invention is to be limited only as defined in the claims.

What is claimed is:

1. In a video processor of the type having an input RF television signal converter, an output RF television signal converter and means for generating a local oscillator heterodyning signal, and for applying said heterodyning signal to said input RF converter for demodulating a selected TV channel to a fixed frequency IF signal, the improvement comprising:
    means for coupling said local oscillator heterodyning signal to said output converter for remodulating said fixed frequency IF signal and outputting said selected TV channel.

2. The processor of claim 1, further including video processing means interposed between said input converter and said output converter.

3. The process of claim 2 and including a further local oscillator for deriving a baseband video frequency signal from said intermediate frequency signal and for remodulating said baseband frequency video signal to form an IF signal corresponding to said intermediate frequency signal.

4. The processor of claim 3 wherein said video frequency signal is a hybrid signal having its low frequency content represented by digital data.

5. A video processor comprising:
    means for generating a local oscillator signal representing a selected television channel frequency;
    means for combining said local oscillator signal with a plurality of received television channel frequencies including said selected television channel frequency for converting said selected television channel frequency to a video signal at a predetermined fixed intermediate frequency;
    means for processing said video signal for providing a processed video signal at said fixed intermediate frequency; and
    means for combining said processed video signal at said fixed intermediate frequency with said local oscillator siganl for providing said processed video signal at said selected television channel frequency.

6. The processor of claim 5 wherein said means for processing said video signal includes:
    demodulating means for developing a baseband video signal;
    means for processing said baseband video signal;
    means for remodulating said processed baseband video signal to said predetermined fixed intermediate frequency; and
    additional oscillator means for controlling said demodulating means and said remodulating means.

7. A cable converter system comprising:
    means for receiving a plurality of television signals, including at least one encrypted television signal;
    means for passing all of said television signals, except said encrypted television signal, to an output;
    module means for receiving said encrypted television signal and for providing a corresponding decrypted television signal to said output, said module means including a local oscillator for tuning said encrypted television signal and converting said encrypted television signal to a fixed frequency IF signal, means for decrypting said fixed frequency IF signal, and means for remodulating said decrypted fixed frequency IF signal to produce said one television signal in decrypted form.

* * * * *